H. O. BICKNELL.

WARDROBE BEDSTEAD.

No. 10,184. Reissued Aug. 22, 1882.

Witnesses:

W. C. Jordinston

Fred. Church.

Inventor:
H. O. Bicknell.

by

Melville Church

Associate Attorney.

N. PETERS, Photo-Lithographer, Washington, D. C.

UNITED STATES PATENT OFFICE.

HENRY O. BICKNELL, OF CHICAGO, ILLINOIS.

WARDROBE-BEDSTEAD.

SPECIFICATION forming part of Reissued Letters Patent No. 10,184, dated August 22, 1882.

Original No. 253,576, dated February 14, 1882. Application for reissue filed June 3, 1882.

*To all whom it may concern:*

Be it known that I, HENRY O. BICKNELL, of Chicago, in the county of Cook and State of Illinois, have invented certain new and useful Improvements in Wardrobe-Bedsteads; and I do hereby declare the following to be a full, clear, and exact description of the invention, such as will enable others skilled in the art to which it pertains to make and use it, reference being had to the accompanying drawings, which form part of this specification.

My invention relates to an improvement in wardrobe-bedsteads, and has for its object to dispense with the usual foot-piece or support heretofore used, and to which the bedsteads has been hinged or otherwise loosely connected, and thereby to simplify and cheapen the structure.

To this end the invention consists, first, in making the front end of the frame rounding, so that the frame can tilt forward to lower the bed into position; secondly, in making the lower end of the frame wider than the upper end, with the lower front corners of the wider portion rounded to facilitate the lowering of the bedstead into position, and to support it when lowered at a suitable height from the floor; and, lastly, in the several combinations more specifically referred to in the claims hereinafter contained.

Figure 1:
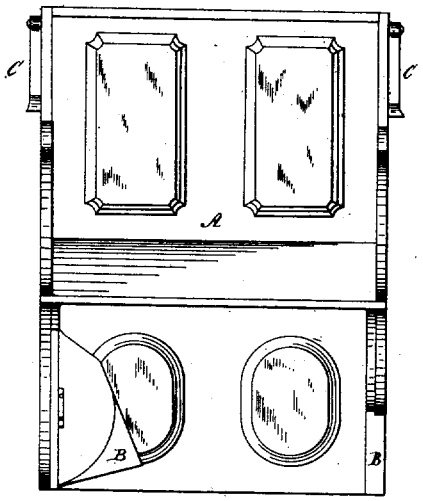
Figure 2:
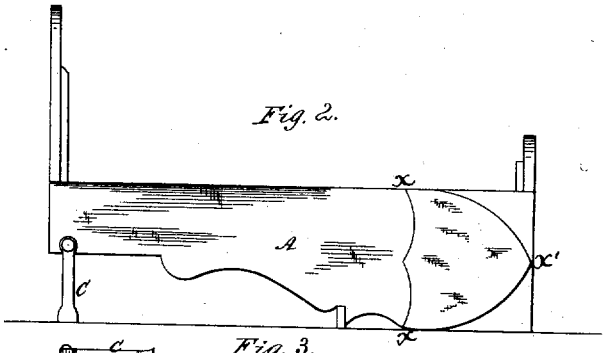
Figure 4:
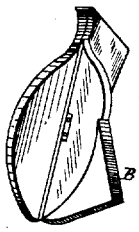
Figure 3:
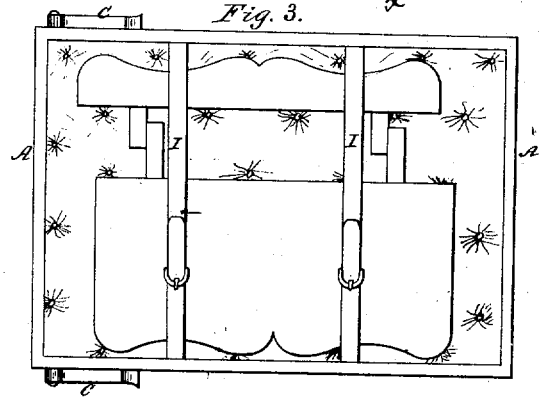

Figure 1 is a front elevation of my invention, showing one of the feet turned inward. Fig. 2 is a side elevation of the same, showing the bed lowered for use. Fig. 3 is a plan view of the bed, showing the head and foot boards fastened in place by means of the straps. Fig. 4 is a perspective of one of the feet hinged to the frame.

A represents a bed-frame, which may be made to imitate a book-case, an organ, a secretary, or any other piece of furniture, and which, instead of being hinged or otherwise loosely attached to the usual base or foot piece, is here made to rest solidly on the floor. The side pieces of the frame A are made considerably wider at one end than at the other, as shown in Fig. 2, and the bedstead, when raised, stands on their wider end. The lower front corners of the frame are rounded away, as shown by the curved line extending from $x$ to $x'$ in Fig. 2, so that the bedstead can be tilted forward from a vertical into a horizontal position. When in the latter position the bed is supported above the floor at one end by means of the swinging legs C, pivoted to the sides of the frame, and at the other end by means of the widened or projecting portion of the frame containing the rounded corners. The feet or braces B are hinged at the inner side of the projecting portion of the frame, so as to be turned in to let the bedstead tilt down or turned out to brace it when tilted up. They are preferably countersunk in recesses in the side pieces, as indicated in Fig. 1, and they should be cut away somewhat at their lower inner corners, $b$, to enable them to swing clear of the floor when turned back. As there is no back to this frame into which the bed portion closes, the head and foot boards are made detachable, and during the day, when the bed is closed up against the wall, are held in position against the bedding, as shown, by means of the straps I, which also serve to hold the mattress and bedding in place.

By dispensing with the usual foot or base piece of the frame, in which the folding part of the bed is usually closed, the construction of the bed is very much simplified and cheapened, and places wardrobe-bedsteads within the reach of poor people, and makes them much easier to operate.

Having thus described my invention, I claim—

1. A wardrobe-bedstead having the lower front corners made rounding, substantially as and for the purpose described.

2. A wardrobe-bedstead having at its lower end a part which projects for the purpose of supporting the bed above the floor when in a horizontal position, and the lower front corners of which projecting part are rounded to enable the bedstead to be tilted easily, substantially as described.

3. A wardrobe-bedstead having its lower front corners made rounding and provided with hinged feet, substantially as described.

4. A wardrobe-bedstead having its lower front corners rounded away and provided with the hinged feet, in combination with the folding legs, which are pivoted to the sides of the upper end of the frame, the frame being made to support one end of the bed, while the pivoted legs support the other, substantially as set forth.

5. In a wardrobe-bedstead which rests solidly upon the floor at its lower end, removable head and foot boards and suitable straps for holding the parts in place while the bed is raised against the wall, substantially as specified.

6. A wardrobe-bedstead which rests solidly upon the floor at its lower end, and which has its lower front corners rounded away and provided with hinged feet, the back portion of the frame being left entirely open for the reception of the bed and made to close against the wall, substantially as described.

In testimony whereof I affix my signature in presence of two witnesses.

HENRY O. BICKNELL.

Witnesses:

D. H. FLETCHER,

L. HILL.